(12) United States Patent
Wetzel et al.

(10) Patent No.: US 6,830,229 B2
(45) Date of Patent: Dec. 14, 2004

(54) TWO-STAGE VALVE SUITABLE AS HIGH-FLOW HIGH-PRESSURE MICROVALVE

(75) Inventors: Todd Garrett Wetzel, Niskayuna, NY (US); Mathew Christian Nielsen, Schenectady, NY (US); Stanton Earl Weaver, Jr., Northville, NY (US); Renato Guida, Wynantskill, NY (US); James Wilson Rose, Guilderland, NY (US); Laura Jean Meyer, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 98 days.

(21) Appl. No.: 10/376,150

(22) Filed: Feb. 28, 2003

(65) Prior Publication Data

US 2003/0146401 A1 Aug. 7, 2003

Related U.S. Application Data

(63) Continuation-in-part of application No. 09/862,809, filed on May 22, 2001, now Pat. No. 6,557,820.

(51) Int. Cl.[7] .............................................. F16K 31/12
(52) U.S. Cl. ............................ 251/30.02; 251/30.05; 251/31; 251/61.1; 251/331; 137/596.16
(58) Field of Search ............................. 257/331, 30.02, 257/30.05, 31; 137/596.16

(56) References Cited

U.S. PATENT DOCUMENTS

| | | | | |
|---|---|---|---|---|
| 6,131,879 A | * | 10/2000 | Kluge et al. .................. | 251/11 |
| 6,182,941 B1 | * | 2/2001 | Scheurenbrand et al. ..................... | 251/129.04 |
| 6,239,685 B1 | * | 5/2001 | Albrecht et al. ........ | 251/129.02 |
| 6,715,733 B2 | * | 4/2004 | Wang et al. ................ | 251/331 |

* cited by examiner

*Primary Examiner*—John Bastianelli
(74) *Attorney, Agent, or Firm*—Scully, Scott, Murphy & Presser

(57) ABSTRACT

A two-stage valve for controlling the flow of fluid from a pressurized fluid supply with an upper main body including a cavity with a contoured inner surface; a lower main body with at least one flow exhaust passage forming a primary flow path through the two-stage valve; a pre-stressed diaphragm sandwiched between the upper and lower main bodies, and pressure control capability for controlling the pressure in the cavity. A first valve opens and closes the flow of gas from the pressurized gas supply to the cavity. A second valve allows the pressure in the cavity to exhaust to the environment. Raising and lowering of the pressure in the cavity causes the pre-stressed diaphragm to open and close the flow of gas from the pressurized gas supply through the primary flow path of the two-stage valve. The design is suitable as a microvalve using Micro-Electro-Mechanical Systems (MEMS) concepts.

26 Claims, 4 Drawing Sheets

TWO-STAGE VALVE SUITABLE AS HIGH-FLOW HIGH-PRESSURE MICROVALVE

CROSS-REFERENCE TO RELATED APPLICATIONS

The present application is a continuation-in-part of U.S. patent application Ser. No. 09/862,809 filed May 22, 2001 now U.S. Pat. No. 6,557,820, by Wetzel et al.

BACKGROUND OF THE INVENTION

The present invention relates to valves for fluids and more specifically to valves suitable for construction as high flow, high-pressure microvalves.

Small fluid valves are known in the art that have been developed using Micro-Electro-Mechanical-Systems (MEMS) concepts. These small-scale valves have the advantage of being able to be produced very precisely and inexpensively using fabrication techniques more commonly used in the microelectronics industry. Typically, such valves also consume very low power and have high switching frequencies. While these valves have many ingenious configurations, most are limited to low pressures, e.g., under 200 psig (approximately 1,500 kPa), and all are limited to extremely low flows, e.g., under $10^{-4}$ kg/second. In fact, none of the actuation mechanisms known, such as electromagnetic, electrostatic, piezoelectric, and shape-memory alloys, are capable by themselves of producing both the forces necessary to overcome high pressures, and the deflections needed to provide large flow areas.

SUMMARY OF THE INVENTION

It is an object of this invention to provide a means for switching high flow rates at high pressures, at the expense of response time, by a device that is particularly suitable for fabrication using micro-fabrication techniques.

The present invention is a two-stage valve for controlling the flow of fluid, typically a gas from a pressurized gas supply, comprising an upper main body including a cavity therein, the cavity including an inner surface; a lower main body having a plurality of pressurized gas supply exhaust outlet passages forming a primary flow path with the pressurized gas supply, the primary flow path including an inlet passage for the flow of gas from the pressurized gas supply; a pre-stressed diaphragm sandwiched between the upper and lower main bodies, the pre-stressed diaphragm having an upper surface opposite to the inner surface of the cavity in the upper main body, the pre-stressed diaphragm having one side of a portion thereof in fluidic communication with the cavity, and the opposite side of the portion thereof in fluidic communication with the pressurized gas supply, the inner surface of the cavity being contoured to correspond with the upper surface of the pre-stressed diaphragm; and pressure control means fluidically coupled to the cavity for controlling the pressure in the cavity to cause the portion of the pre-stressed diaphragm to open the flow of gas from the pressurized gas supply through the primary flow path of the two-stage valve and to cause the portion of the pre-stressed diaphragm to close the flow of gas from the pressurized gas supply through the primary flow path of the two-stage valve, at least a portion of the inner surface of the cavity in the upper main body providing a resting surface for the upper surface of the pre-stressed diaphragm, at least one of the plurality of supply fluid exhaust outlet passages being directed such that a component of supply fluid exhaust outlet velocity is in a direction opposite to a component of supply fluid exhaust outlet velocity in at least one other of the plurality of supply fluid exhaust outlet passages.

The pressure control means comprises the lower main body having a secondary flow path communicating with the pressurized gas supply, the upper main body having a secondary flow path communicating with the secondary flow path in the lower main body, and communicating with the cavity in the upper main body; a first valve providing (a) an isolating means for isolating the flow of gas from the pressurized gas supply to the cavity in the upper main body, and (b) an opening means for allowing the gas from the pressurized gas supply to flow to the cavity in the upper main body, the upper main body having an exhaust passage for fluidically communicating the cavity with an environment at a pressure lower than the pressure of the pressurized gas supply, a second valve installed in the exhaust passage, the second valve providing an isolating means for fluidically isolating the cavity in the upper main body from the environment, and an opening means for opening the cavity in the upper main body to exhaust to the environment.

The first valve is installed in one of (a) the secondary flow path in the lower main body, and (b) the secondary flow path in the upper main body. The lower main body can include a cavity. The lower main body further can include a boss formed in the cavity of the lower main body, the boss surrounding a hole acting as the inlet passage for the flow of gas from the pressurized gas supply, the hole fluidically coupled to the opposite side of the portion of the pre-stressed diaphragm. Preferably, the boss formed in the cavity of the lower main body is positioned coincident with the center of the cavity of the lower main body. The inlet passage from the pressurized gas supply can be directed in a direction substantially perpendicular to the pre-stressed diaphragm. The valve has a form factor F defined as a height H/length L wherein the form factor F is not greater than 0.1. The diaphragm is comprised typically of titanium.

DETAILED DESCRIPTION OF EXEMPLARY EMBODIMENTS

First Embodiment

Figure 1:
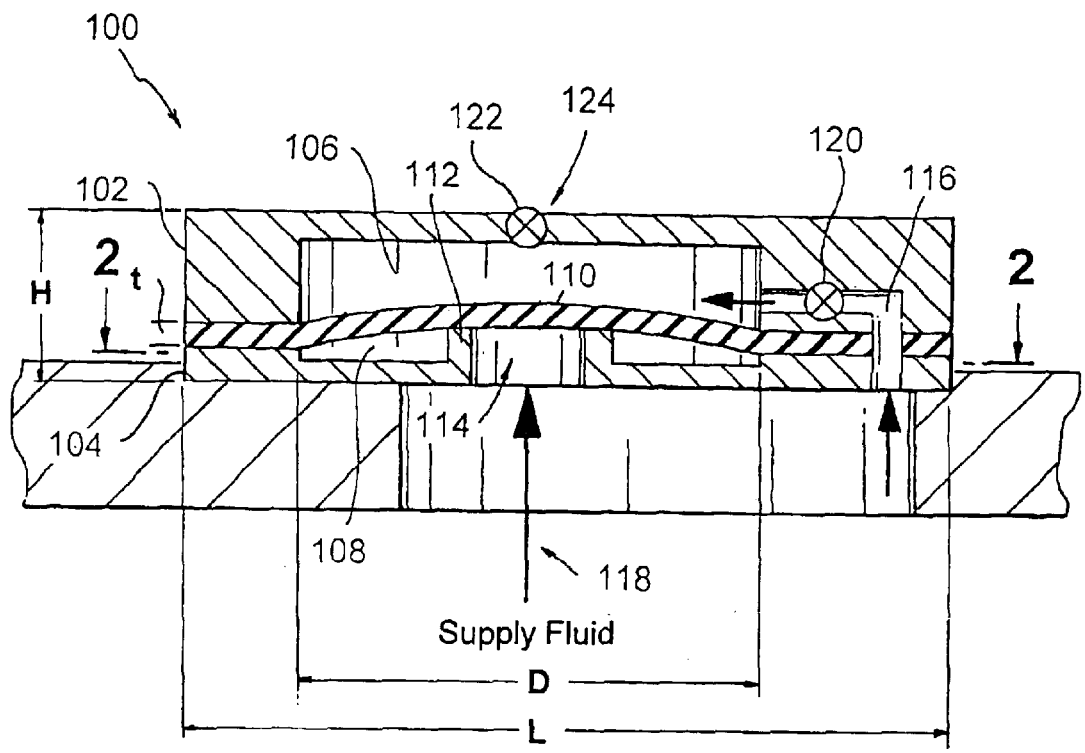
FIG. 1 illustrates the two-stage valve of the first embodiment of the present invention in the closed position.

In FIG. 1, the two-stage valve of the first embodiment of present invention is illustrated. The two-stage valve 100 comprises an upper main body 102 which is made typically of one or more laminations of silicon, silicon carbide, or other suitable material compatible with micro-fabrication techniques, and a lower main body 104 typically made of one or more of the same materials. A cavity 106, hereinafter referred to as the upper cavity 106, is formed in the upper main body 102. Another cavity 108, hereinafter referred to as the lower cavity 108, is formed in the lower main body 104. The upper main body 102 and the lower main body 104 sandwich a diaphragm 110. The diaphragm 110 is pre-loaded so that it is normally sealed on the boss 112 formed in the middle of the lower main body 104.

A hole 114 through the middle of the boss 112 acts as the inlet for the main flow path. Passages (shown in FIG. 2) are formed in the lower main body 104 parallel to the diaphragm 110 to permit the flow to exhaust when the two-stage valve 100 is opened.

A secondary flow path 116 is formed in the upper main body 102 and the lower main body 104 to connect the side of the diaphragm 110 facing the upper main body 102, hereinafter referred to as the upper side of the diaphragm 110 to the high-pressure gas supply 118. A first small valve 120 is placed in the secondary flow path 116 to connect and disconnect the top cavity 106 with the high-pressure fluid supply 118. The high-pressure fluid is typically a gas although in some applications, a liquid can become the high-pressure fluid. A second small valve 122 is placed in an exhaust passage 124 on the top of the upper main body 102 to provide a means to release high-pressure gas to the environment. (Small valve 122 is shown in the closed position in FIG. 1). Both the first and second small valves, 120 and 122, are actuated typically by titanium nickel (TiNi) or piezoelectric actuators, not shown. The design of the first and second small valves 120 and 122 is the subject of co-pending U.S. patent application, Ser. No. 10/277,028 filed Oct. 21, 2002 which is incorporated herein by reference. The entire assembly of the two-stage valve 100 typically is mounted on and attached to a pressure vessel 126 that contains the high-pressure gas supply 118.

Figure 2:
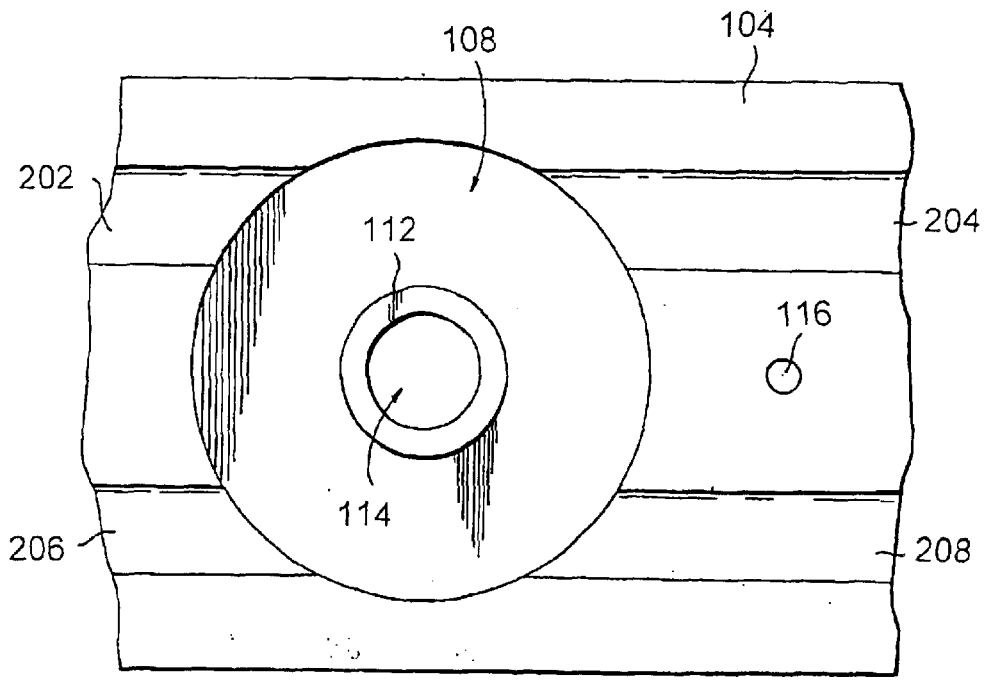
FIG. 2 illustrates cross-sectional plan view 2—2 of the two-stage valve of the first embodiment of the present invention.

FIG. 2 illustrates a cross-sectional plan view 2—2 of the two-stage valve of the present invention as illustrated in FIG. 1. Exhaust passages 202, 204, 206, and 208, referred to previously, are formed in the lower main body 104 parallel to the diaphragm 110 to permit the flow to exhaust to thrusters (not shown) when the two-stage valve 100 is opened. Supply gas 118 flows through the center of hole 114 through the middle of the boss 112 that acts as the inlet for the main flow path and the secondary flow path 116.

Referring to FIG. 1, the operations to close the two-stage microvalve 100 are as follows. Second small valve 122 is closed to seal the upper cavity 106 from the atmosphere. First small valve 120 is opened to expose the upper cavity 106 to the high-pressure gas supply 118, thereby pressurizing the upper side of diaphragm 110. After a short time, typically 10 milliseconds or less, both the lower side and the upper side of the diaphragm 110 reach essentially the same pressure as the high-pressure gas supply 118. However, the lower side of the diaphragm 110 will experience slightly lower pressures due to the velocity of the flow passing through the hole 114 that acts as the inlet for the main flow path. Once the gas pressures are equalized across the diaphragm 110, i.e., the pressure on the upper side of the diaphragm 110 equals the pressure on the lower side of the diaphragm 110, the stresses in the pre-loaded diaphragm 110 tend to pull the diaphragm 110 closed on the boss 112. Once the diaphragm 110 is closed on the boss 112, the pressure on the upper side of the diaphragm 110 acts over the entire surface area of the upper side of the diaphragm 110 while the pressure on the lower side of the diaphragm 110 acts only over the smaller area of hole 114 that acts as the inlet for the main flow path. The pressure acting on the center of the diaphragm 110 in the upper cavity 106 is the same as the high-pressure gas supply 118, but the pressure at the lower cavity 108 is lower. This pressure imbalance causes the diaphragm 110 to seal tightly against the boss 112. As a result, the flow of gas through the two-stage valve 100 is shut off.

Figure 3:
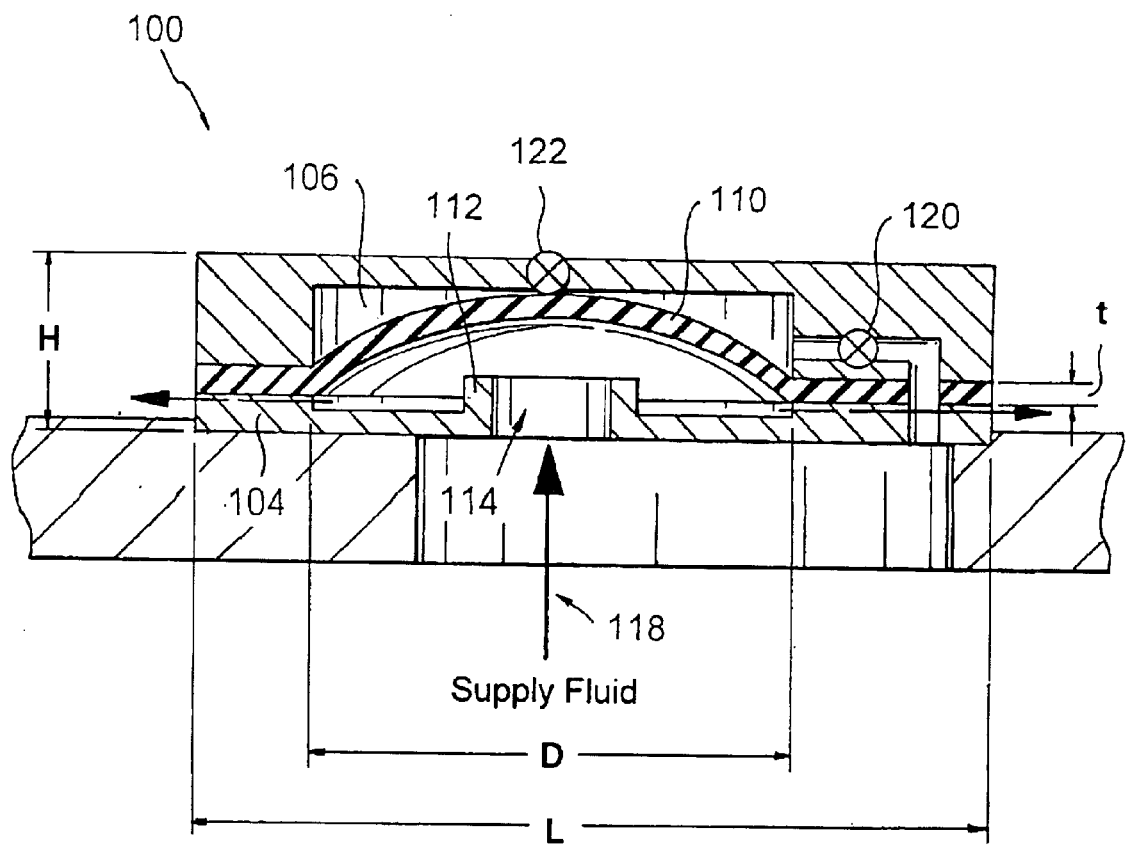
FIG. 3 illustrates the two-stage valve of the first embodiment of the present invention in the open position.

Referring to FIG. 3, the operations to open the two-stage valve 100 are as follows. First small valve 120 is closed, thus isolating the high-pressure gas supply 118 from the upper cavity 106. Second small valve 122 is opened, thus permitting the upper cavity 106 to communicate with the environment. The high-pressure gas in the upper cavity 106 exhausts to the environment, until, after a short time, typically 10 milliseconds or less, the pressure in the upper cavity 106 approaches the pressure of the environment. In the meantime, the high pressure of the high-pressure gas at the hole 114 that acts as the inlet passage for the main flow path of the high-pressure gas from the high-pressure gas supply 118 starts to force the diaphragm 110 to lift upwards towards the upper cavity 106 and away from the boss 112, thereby permitting the high-pressure gas to flow through the hole 114 that acts as the inlet passage for the main flow path, and the high-pressure gas then flows in the radial direction away from the hole 114 at the center of the lower main body 104, and parallel to the diaphragm 110, through the passages 202, 204, 206, and 208 to the thrusters (not shown). The inlet passage 114 from the high-pressure gas supply typically is directed in a direction substantially perpendicular to the lower surface of the pre-stressed diaphragm. The flow of the high-pressure gas in a radial direction permits the high-pressure gas to be exhausted in more than one direction away from the two-stage valve 100. Although the exhaust passages 202, 204, 206, and 208 are illustrated as being aligned and parallel to each other, those skilled in the art recognize that the exhaust passages 202, 204, 206, and 208 can be oriented in any radial direction to permit the exhaust gas to flow away from the hole 114 that acts as the main flow path.

Figure 4:
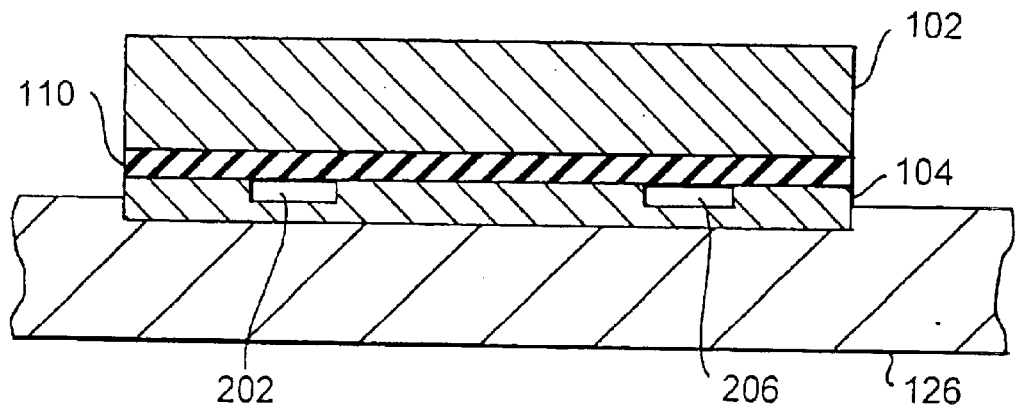
FIG. 4 illustrates cross-sectional elevation view 4—4 of the two-stage valve of the first embodiment of the present invention.

FIG. 4 illustrates a side elevation view of the two-stage valve 100. The upper main body 102 and the lower main body 104 sandwich the diaphragm 110. The exhaust passages 202 and 206 are illustrated as channels permitting the high-pressure gas supply 118 to exhaust to the environment. The entire assembly of the two-stage valve 100 is illustrated as mounted on and attached to the pressure vessel 126 that contains the high-pressure gas supply 118.

Those skilled in the art will recognize that the two-stage valve can be designed for essentially any size application.

Figure 5:
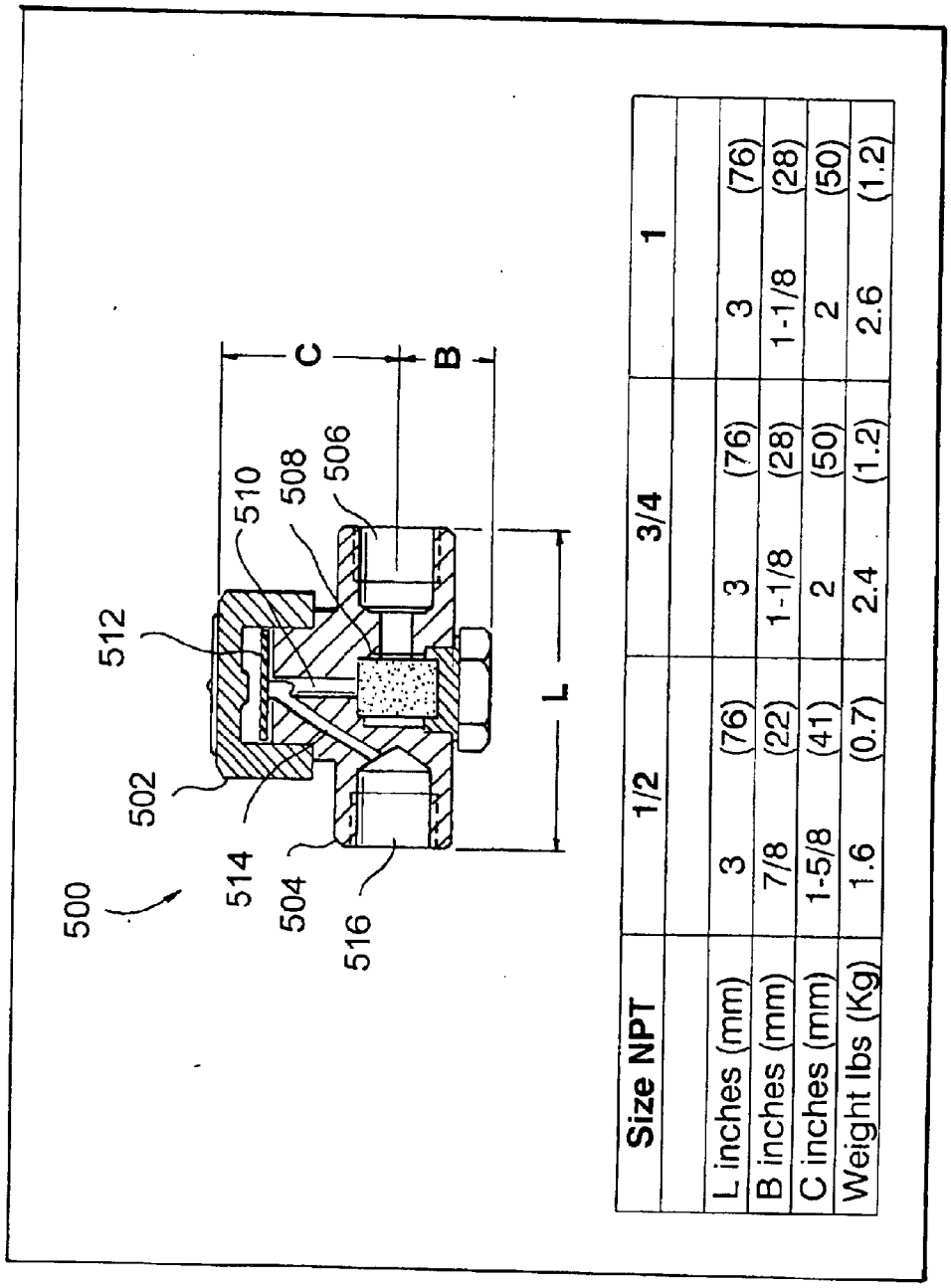
FIG. 5 illustrates a cross-sectional view with characteristic dimensions of a thermodynamic disc steam trap known in the art.

In particular, with regard to the size, FIG. 5 illustrates a cross-sectional view with characteristic dimensions of a thermodynamic disc steam trap known in the art, specifically a Model TD-300 trap manufactured by the Ogontz Corporation® of Willow Grove, Pa. This type of valve is chosen for illustration because some features superficially resemble the first embodiment of the present invention. Disc trap 500 has a cap 502 mounted on a body 504. When a pulse of water mixed with the incoming steam enters at inlet port 506 and passes through the strainer 508, the water passes through channel 510 and raises the disc 512 thereby enabling the water to exit through channel 514 leading to outlet port 516. For the smallest size of 0.5 inches (12.2 mm) diameter National Pipe Thread (NPT), the total height is represented by the dimensions of B+C, which equals 2.5 inches 63 mm. The length L is 3 inches or 76 mm.

In contrast, in the first embodiment of the present invention, as shown in FIG. 1 and FIG. 3, the height H is typically as low as 0.125 inches (3.175 mm), the effective diameter D of the diaphragm 110, which corresponds to the diameter of the cavity 604 in the upper main body 602, typically is in the range of 1 inch (25.4 mm) and the length L is typically 1.5×D, or 1.5 inches (37.6 mm). The diaphragm 110 is typically made of titanium, although other materials can be used. The thickness t of the diaphragm 110 is typically in the range of 0.001 inches (0.0254 mm), and can be less than this thickness depending on the particular application. The valve 100 can be scaled larger or even smaller, depending on the required flow rates. Therefore, as can be appreciated by those skilled in the art, with a height H as low as 0.125 inches or 3.175 mm, the present invention of valve 100 enables a very low profile or form factor F=H/L as compared to a comparable type of prior art valve, e.g., disc trap 500, which has a form factor F=(B+C)/L=63/76= 0.83. In the current example, the form factor for the valve 100 of the present invention is F=3.175/37.6=0.0844, or nearly $1/10^{th}$ that of the prior art valve. Consequently, the valve 100 can be made very flat, permitting it to fit into application packages where the corresponding dimension accommodating the height H is very small.

Second Embodiment

Figure 6:
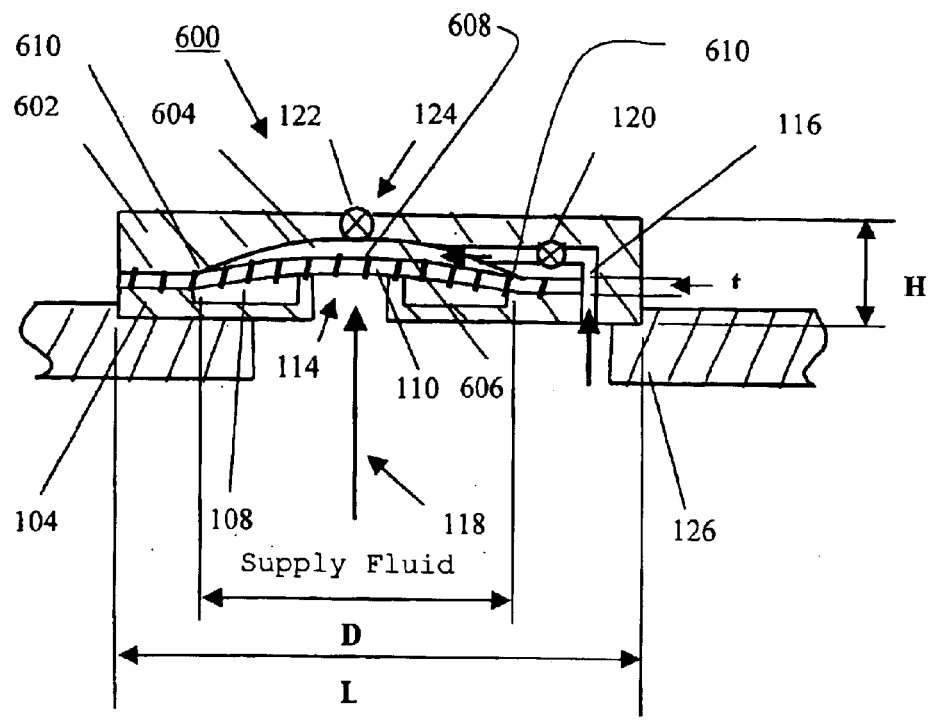
FIG. 6 illustrates a cross-sectional elevation view of a second embodiment of the two-stage valve of the present invention in the closed position.
Figure 7:
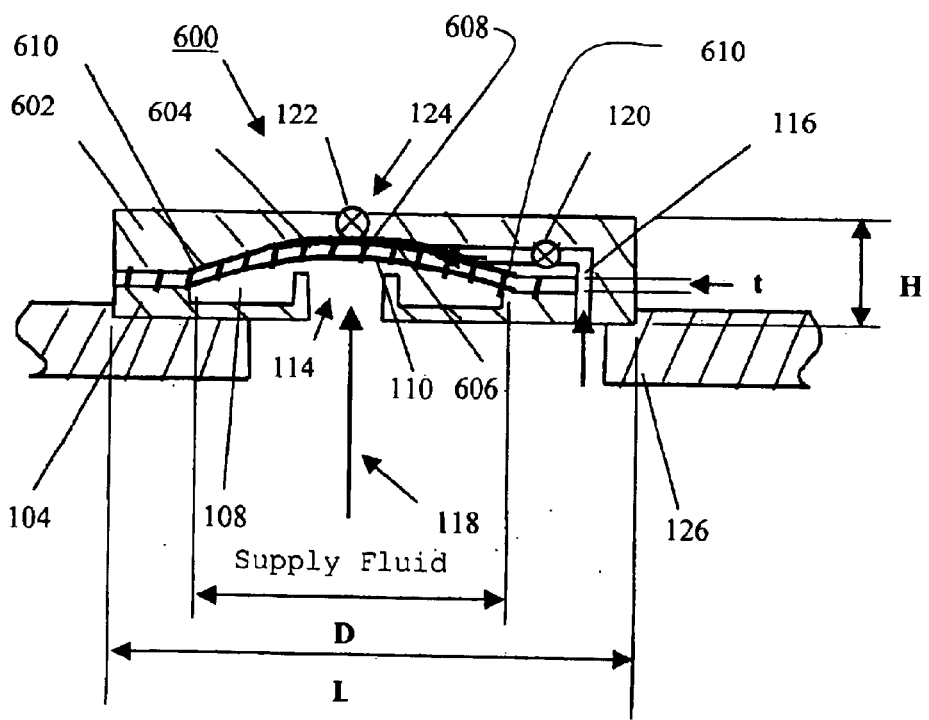
FIG. 7 illustrates a cross-sectional elevation view of the two-stage valve of FIG. 6 in the open position.

FIGS. 6 and 7 illustrate a second embodiment of the two-stage valve of the present invention. For simplicity, only those features which differ from FIGS. 1 to 4 have been renumbered. Valve 600 differs from valve 100 in that, as compared to upper main body 102, upper main body 602 has a cavity 604 with an inner surface 606 with a contoured or domed shape to correspond to the contoured or domed shape of the upper surface 606 of pre-stressed diaphragm 110. When the valve 600 is in the open position as shown in FIG. 7, the contoured or domed shape of the inner surface 606 provides a distributed resting surface for at least a portion of upper surface 608 of the diaphragm 110.

The distributed resting surface provided by the inner surface 606 reduces the stress concentration that would otherwise occur at the edge 610 of the inner surface 606. Reduction of the stress concentration correspondingly reduces the potential for rupture of the diaphragm 110. This is particularly desirable when the thickness t of the diaphragm 110 must be reduced to provide a greater opening volume by increased flexing to accommodate high-pressure and high-flow conditions, e.g., at pressures equal to or greater than 200 psig (approximately 1,500 kPa) and flows equal to or greater than $10^{-4}$ kg/second.

The dimensions H, D and L and the thickness and the material of the diaphragm 110 of the first embodiment as discussed previously are applicable as well to the dimensions H, D and L of the second embodiment as illustrated in FIGS. 6 and 7. Also, the plan view of valve 600 is identical to that shown in FIG. 2 for valve 100, and is therefore not shown separately for the second embodiment. Similarly, the cross-sectional elevation view 4—4 of the two-stage valve of the first embodiment as shown in FIG. 4 is also applicable as an elevation view of valve 600 of the second embodiment, and is therefore not shown separately.

As noted previously for the first embodiment, the high-pressure gas can be exhausted in more than one direction away from the two-stage valve 600. Although the exhaust passages 202, 204, 206, and 208 are illustrated as being aligned and parallel to each other, those skilled in the art recognize that the exhaust passages 202, 204, 206, and 208 can be oriented in any radial direction to permit the exhaust gas to flow away from the hole 114 that acts as the main flow path. Therefore, at least one of the plurality of supply gas exhaust outlet passages 202, 204, 206, and 208 is directed such that a component of supply gas exhaust outlet velocity is in a direction opposite to a component of supply gas exhaust outlet velocity in at least one other of the plurality of supply gas exhaust outlet passages.

Although the two-stage valve of both the first and second embodiments is illustrated with the upper main body in the upper position and the lower main body in the lower position, those skilled in the art will recognize that the two-stage valve can be positioned in any orientation.

When designed as a microvalve, the two-stage valve overcomes the inherent lack of force in conventional actuation technologies by tapping the high potential energy inherent in the high-pressure gas supply. As noted, the diaphragm 110 is made preferably of titanium. The actuators for the first and second small valves 120 and 122, respectively, preferably are made of titanium nickel (TiNi) or piezoelectric and can have small dimensions and small throws (valve operation distance parameters). Such requirements are consistent with piezoelectric and shape memory alloy requirements. The first and second small valves switch a small secondary flow, which in turn acts on the large diaphragm to control a larger flow. By seeping this secondary flow through a very small valve, the filling process for the two-stage valve, when designed as a microvalve, is substantially slower than the small valve actuation speed. A proper design optimizes the tradeoff between the small valves controlling a small, high-pressure flow to switch a large, high-pressure flow at the expense of switching time.

The invention has now been explained with reference to specific embodiments. Other embodiments will be apparent to those of ordinary skill in the art in view of the foregoing description. It is not intended that this invention be limited except as indicated by the appended claims and their full scope equivalents.

What is claimed is:

1. A two-stage valve for controlling the flow of fluid therethrough from a pressurized fluid supply comprising:

an upper main body including a cavity therein, said cavity including an inner surface;

a lower main body having a plurality of pressurized fluid supply exhaust outlet passages forming a primary flow path with the pressurized fluid supply, said primary flow path including an inlet passage for the flow of fluid from the pressurized fluid supply;

a pre-stressed diaphragm sandwiched between said upper and lower main bodies, said pre-stressed diaphragm having an upper surface opposite to the inner surface of said cavity in said upper main body, said pre-stressed diaphragm having one side of a portion thereof in fluidic communication with said cavity, and the opposite side of said portion thereof in fluidic communication with the pressurized fluid supply, the inner surface of said cavity being contoured to correspond with the upper surface of said pre-stressed diaphragm; and pressure control means fluidically coupled to said cavity for controlling the pressure in said cavity to cause said portion of said pre-stressed diaphragm to open the flow of fluid from the pressurized fluid supply through said primary flow path of said two-stage valve and to cause said portion of said pre-stressed diaphragm to close the flow of fluid from the pressurized fluid supply through said primary flow path of said two-stage valve, at least a portion of the inner surface of said cavity in said upper main body providing a resting surface for the upper surface of said pre-stressed diaphragm, at least one of said plurality of supply fluid exhaust outlet passages being directed such that a component of supply fluid exhaust outlet velocity is in a direction opposite to a component of supply fluid exhaust outlet velocity in at least one other of said plurality of supply fluid exhaust outlet passages.

2. The two-stage valve of claim 1 wherein said pressure control means comprises:

said lower main body having a secondary flow path communicating with the pressurized fluid supply, said upper main body having a secondary flow path communicating with said secondary flow path in said lower main body, and communicating with said cavity in said upper main body;

a first valve providing (a) an isolating means for isolating the flow of fluid from the pressurized fluid supply to said cavity in said upper main body, and (b) an opening means for allowing the fluid from the pressurized fluid supply to flow to said cavity in said upper main body, said upper main body having an exhaust passage for fluidically communicating said cavity with an environment at a pressure lower than the pressure of the pressurized fluid supply, a second valve installed in said exhaust passage, said second valve providing an isolating means for fluidically isolating said cavity in said upper main body from the environment, and an opening means for opening said cavity in said upper main body to exhaust to the environment.

3. The two-stage valve of claim 2 wherein said first valve is installed in one of (a) said secondary flow path in said lower main body, and (b) said secondary flow path in said upper main body.

4. The two-stage valve of claim 1 wherein said lower main body includes a cavity.

5. The two-stage valve of claim 4 wherein said lower main body has a boss formed in said cavity of said lower main body, said boss surrounding a hole acting as said inlet passage for the flow of fluid from the pressurized fluid supply, said hole fluidically coupled to said opposite side of said portion of said pre-stressed diaphragm.

6. The two-stage valve of claim 5 wherein said boss formed in said cavity of said lower main body is positioned coincident with the center of said cavity of said lower main body.

7. The two-stage valve of claim 1 wherein said inlet passage from the pressurized fluid supply is directed in a direction substantially perpendicular to said pre-stressed diaphragm.

8. The two-stage valve of claim 1 wherein the fluid is a gas.

9. The two-stage valve of claim 1 wherein the fluid is a liquid.

10. The two-stage valve of claim 1 wherein said diaphragm has an effective diameter D corresponding to the diameter of said cavity in said upper main body.

11. The two-stage valve of claim 10 wherein the effective diameter D is not greater than 1.0 inch (25.4 mm).

12. The two-stage valve of claim 1 wherein the valve has a length L that is proportional to D.

13. The two-stage valve of claim 12 wherein the length $L=1.5 \times D$.

14. The two-stage valve of claim 1 wherein the valve has a form factor F defined as a height H/length L.

15. The two-stage valve of claim 14 wherein the form factor F is not greater than 0.1.

16. The two-stage valve of claim 1 wherein the pre-stressed diaphragm is comprised of titanium.

17. A two-stage valve for controlling the flow of fluid therethrough from a pressurized fluid supply comprising:

an upper main body including a cavity therein;

a lower main body having a plurality of pressurized fluid supply exhaust outlet passages forming a primary flow path with the pressurized fluid supply, said primary flow path including an inlet passage for the flow of fluid from the pressurized fluid supply;

a pre-stressed diaphragm sandwiched between said upper and lower main bodies, said pre-stressed diaphragm having one side of a portion thereof in fluidic communication with said cavity, and the opposite side of said portion thereof in fluidic communication with the pressurized fluid supply; and pressure control means fluidically coupled to said cavity for controlling the pressure in said cavity to cause said portion of said pre-stressed diaphragm to open the flow of fluid from the pressurized fluid supply through said primary flow path of said two-stage valve and to cause said portion of said pre-stressed diaphragm to close the flow of fluid from the pressurized fluid supply through said primary flow path of said two-stage valve, at least one of said plurality of supply fluid exhaust outlet passages being directed such that a component of supply fluid exhaust outlet velocity is in a direction opposite to a component of supply fluid exhaust outlet velocity in at least one other of said plurality of supply fluid exhaust outlet passages, said pre-stressed diaphragm having an effective diameter D corresponding to the diameter of said cavity in said upper main body, said two-stage valve having a length L that is proportional to said effective diameter D, said two-stage valve having a height H, said height H and said length L defining a form factor F as height H/length L, said form factor F being not greater than 0.1.

18. The two-stage valve of claim 17 wherein the pre-stressed diaphragm is comprised of titanium.

19. The two-stage valve of claim 17 wherein said pressure control means comprises:

said lower main body having a secondary flow path communicating with the pressurized fluid supply, said upper main body having a secondary flow path communicating with said secondary flow path in said lower main body, and communicating with said cavity in said upper main body;

a first valve providing (a) an isolating means for isolating the flow of fluid from the pressurized fluid supply to said cavity in said upper main body, and (b) an opening means for allowing the fluid from the pressurized fluid supply to flow to said cavity in said upper main body, said upper main body having an exhaust passage for fluidically communicating said cavity with an environment at a pressure lower than the pressure of the pressurized fluid supply, a second valve installed in said exhaust passage, said second valve providing an isolating means for fluidically isolating said cavity in said upper main body from the environment, and an opening means for opening said cavity in said upper main body to exhaust to the environment.

20. The two-stage valve of claim 19 wherein said first valve is installed in one of (a) said secondary flow path in said lower main body, and (b) said secondary flow path in said upper main body.

21. The two-stage valve of claim 20 wherein said lower main body includes a cavity.

22. The two-stage valve of claim 21 wherein said lower main body has a boss formed in said cavity of said lower main body, said boss surrounding a hole acting as said inlet passage for the flow of fluid from the pressurized fluid supply, said hole fluidically coupled to said opposite side of said portion of said pre-stressed diaphragm.

23. The two-stage valve of claim 21 wherein said boss formed in said cavity of said lower main body is positioned coincident with the center of said cavity of said lower main body.

24. The two-stage valve of claim 17 wherein said inlet passage from the pressurized fluid supply is directed in a direction substantially perpendicular to said pre-stressed diaphragm.

25. The two-stage valve of claim 17 wherein the fluid is a gas.

26. The two-stage valve of claim 17 wherein the fluid is a liquid.

* * * * *